United States Patent Office 2,848,376
Patented Aug. 19, 1958

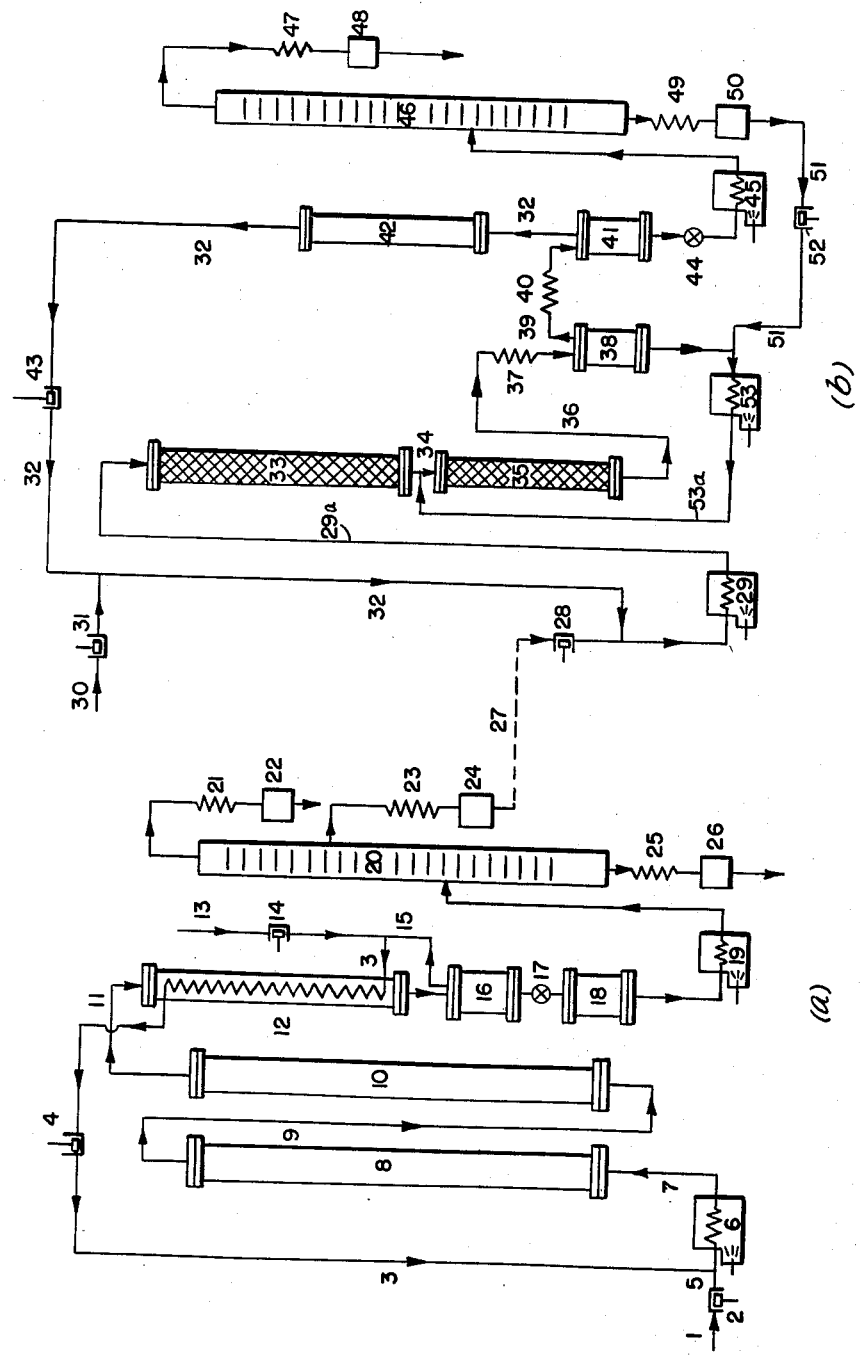

2,848,376

TWO-STAGE HYDROGENATION PROCESS FOR THE PRODUCTION OF GASOLINE FROM HYDROCARBON OILS

Willi Oettinger and Wilhelm von Fuener, Ludwigshafen (Rhine), Germany, assignors to Badische Anilin- & Soda-Fabrik Aktiengesellschaft, Ludwigshafen (Rhine), Germany Application July 30, 1954, Serial No. 446,970

Claims priority, application Germany August 17, 1953

5 Claims. (Cl. 196—49)

This invention relates to a new and improved process for the production of gasoline from oils.

We have found that gasolines with a high octane number are obtained from petroleums, their higher boiling fractions, residues of destructive hydrogenation, cracking and extraction products, as well as shale oils, tar oils and destructive hydrogenation products of solid and liquid carbonaceous substances by leading the initial materials together with hydrogen or gases containing hydrogen under a pressure above 50 atmospheres, as for example 50 to 150 atmospheres, preferably above 150 atmospheres, at temperatures of 250° to 450° C. over synthetic silicates, especially those prepared by decomposition of silicon halides or by precipitation, which contain at least one of the metals of the 5th to the 8th groups of the periodic system as a silicate, in such a way that an immaterial cracking of the carbon linkage in the initial material takes place and then leading the reaction products at temperatures of 360° to 550° C. together with hydrogen also under a pressure of more than 50 atmospheres over an aluminium and/or magnesium silicate which is provided with an oxide or sulphide of one or more metals of the 6th to the 8th groups of the periodic system, for the purpose of cracking to gasoline. The silicates in the first stage can contain up to a maximum of 10% of at least one metal from the group aluminium and magnesium in the form of a compound.

As initial materials there come into question crude oils, such as petroleums, shale oils and tar oils, and also fractions or the same of higher boiling point than gasoline, as for example middle oils or heavy oils or mixtures of the same, as well as residues or the products obtained by thermal treatment, such as pressure hydrogenation or cracking, as for example the products, preferably their high boiling fractions, obtained by pressure hydrogenation of oil and cracking residues in the liquid phase.

Before being worked up it is advantageous, especially with initial materials containing ash, to lead them through a reaction chamber provided with large-surfaced substances at elevated temperature, as for example 300° to 500° C. These are preferably so shaped that at least a third and advantageously at least half, as for example 40 to 70%, of the reaction space between these substances is empty. Open hollow bodies, as for example rings, of porous or non-porous material may be used.

The initial materials are led together with 0.2 to 4, preferably 0.5 to 2, cubic metres of hydrogen or hydrogen-containing gas, as for example watergas, per kilogram of oil under a pressure of 50 to 600 atmospheres, in particular 100 to 350 atmospheres, over a catalyst which consists of one or more silicates of vanadium, molybdenum, tungsten, chromium, uranium, rhenium, nickel, cobalt, iron, platinum, palladium or ruthenium. In addition to these silicates, the catalyst may contain aluminium and/or magnesium silicate, but the content of aluminium and/or magnesium silicate should not exceed 10%. The content of these metals, if they are present at all, should preferably remain within the limits of 0.5 and 5%. The aluminium or magnesium can also be present in the catalyst in a form other than as silicate, as for example as oxide. Moreover there may also be used, for example instead of aluminium or/and magnesium silicates, a mixture of aluminium oxide or/and magnesium oxide and silicic acid. The catalyst may be prepared from a waterglass solution and a soluble metal salt solution by precipitation with ammonia, ammonium sulphide, ammonium carbonate, amines or caustic alkalies at room or raised temperature. It is preferable to mix the components with each other very rapidly and it is advantageous to use an excess of the precipitant. The gel may also be formed from the desired solution at a pH of 2 to 7 without the addition of a precipitant. The precipitate formed is washed, dried at 30° to 150° C. for a period of 3 to 15 hours and slowly heated to temperatures of 150° to 400° C. during a period of 3 to 40 hours. The catalyst can then be calcined at a temperature of 400° to 800° C. On this catalyst it is advantageous to apply an oxide or sulphide of a metal of the 6th and/or 8th groups of the periodic system, as for example an oxide or sulphide of molybdenum, tungsten, nickel or cobalt or mixtures of the same or compounds, as for example cobalt molybdate or nickel tungstate.

The throughput, which advantageously lies between 0.3 and 5 kilograms, preferably 0.5 to 2 kilograms, of oil per litre of catalyst per hour, and the temperature, which preferably amounts to 275° to 450° C. and advantageously 300° to 420° C., are so correlated that practically no change in the boiling curve takes place, whereby merely a refining of the initial materials takes place. By working in this way the carbon linkage of the initial material remains practically unchanged. At the most there is only a trivial cracking of about 1 to 5%. On the contrary the nitrogen, sulphur and oxygen compounds are converted into the corresponding hydrocarbons. A displacement of the boiling curve by about 20% may occur by the formation of components of lower boiling point.

When using a pressure below 150 atmospheres, the catalyst is regenerated from time to time if its refining action subsides. When it begins to subside, the reaction temperature is first raised so that the refining effect remains the same. The increase can be carried up to a temperature at which an undesirably high cracking of the carbon linkage of the initial material occurs. The catalyst is then regenerated, for example with air, and if desired aftertreated with hydrogen sulphide. The catalyst can then be used again at the lower temperature first used.

The product thus obtained is then led together with hydrogen over another catalyst in the second stage. The catalyst carrier in this case is aluminium silicate and/or magnesium silicate, which is also intended to include a mixture of silicic acid and aluminium oxide and/or magnesium oxide. The carrier is provided with 0.5 to about 15% of an oxide or sulphide of molybdenum, tungsten, chromium, nickel or cobalt. A plurality of these metals may also be used. Thus molybedenum or tungsten may be used with nickel or cobalt, it being advantageous to select the atomic ratio of the metals of the iron group to the metals of the 6th group between 1:20 and 17:20.

Suitable catalysts for the second stage include those disclosed in U. S. Patent No. 2,709,151.

The silicates are preferably prepared synthetically by producing them from waterglass solution and a solution of a compound of aluminium or magnesium, if desired with the co-employment of a precipitant. Compounds of copper, silver, iron, zinc, lead, thorium, titanium, manganese, zirconium, tin or vanadium may also be added. The aluminium or magnesium may be partly replaced by these metals. The precipitation can take place at a pH below 7. If the catalyst carrier has a pH above 7, a base exchange can be carried out with a metal salt solution in order to adjust the pH to 7 or less than 7. It is very advantageous to bring the waterglass solution together with an acid metal salt solution and a precipitant so rapidly that no turbidity or formation of a gel takes place but so that a pulverulent precipitate is formed. If the metal salt solution is not sufficiently acid to ensure that the mixture of waterglass solution and the metal salt solution has a pH below 7, free acid is added. The components are brought together very rapidly, that is within seconds or at the most within a few minutes. The precipitants already mentioned above are also suitable here.

The silicic acid, preferably as a moist gel, may also be impregnated with the metal salt solution and the metal salt solution precipitated on the silica gel if desired with precipitants. The product is then washed, advantageously the ammoniacal water, dried and heated as already described. The moist silica gel may also be intimately mixed with the precipitated metal salt precipitate, which may also be in gel form, and then dried and heated to temperatures up to 550° C.

The catalyst can consist to the extent of 30 to 95% of silicic acid.

Catalysts with only a small amount of silicic acid, as for example 8 to 30%, which may be produced in the same way, have, however, also proved suitable. In this case it is preferable to start from an aluminium salt solution which is precipitated at raised temperature, as for example 50° to 100° C., and preferably at a pH of 7 to 11. During the precipitation, or subsequently, there is added silicic acid, silica gel or waterglass solution. This catalyst should, however, contain at the most 10% of silicates of the metals of the 5th to the 8th groups of the periodic system. It is advantageous to use catalysts which are practically free from these silicates.

The reaction products of the first stage are supplied, preferably in the vaporous phase with the existing amount of hydrogen, if desired after the addition of further amounts of hydrogen, to the second stage. If reaction products, such as ammonia and water, are formed in large amounts during the refining, these are removed before introduction into the second stage in order not to impair the activity of the catalyst. The addition of hydrogen is necessary if the first stage is carried out with a small amount of hydrogen, as for example 200 to 1000 litres per kilogram of initial material. Generally speaking the same pressure as in the first stage is used, but it may be higher or lower. The throughput amounts to 0.6 to 5, in particular 0.8 to 2, kilograms of oil per litre of catalyst per hour and the temperature to 360° to 550° C., preferably 360° to 500° C. Both of these, and also the pressure, are so correlated that a cracking of the refined product of the first stage to gasoline takes place. The higher boiling fraction is returned to the reaction chamber so that an extensive conversion to gasoline takes place. The advantage of working in this way consists in the fact that with the said catalysts in the first and second stages a gasoline rich in aromatics and with a high octane number and very good sensitivity to lead is obtained. If on the contrary the other refining catalysts which have hitherto been regarded in pressure hydrogenation technique as the best, are used, the octane number lies considerably lower.

The following examples will further illustrate this invention but the invention is not restricted to these examples.

*Example 1*

The cracking residue of a crude oil is subjected to a catalytic pressure hydrogenation in the sump phase in a conventional manner as indicated by portion (a) of the figure. A middle oil fraction obtained thereby is treated in accordance with the invention to produce gasoline as indicated by portion (b) of the figure which follows the dotted line 27.

In portion (a) of the figure a cracking residue is introduced at 1, compressed by means of pump 2 to a pressure of about 550 atmospheres, and conducted through line 5 to the gas-heated tube preheater 6 together with recycle and fresh hydrogen which reaches line 5 by way of line 3 and circulating pump 4. Fresh hydrogen is introduced at 13, compressed by pump 14 to 550 atmospheres, and combined with recycle hydrogen from line 15. Fresh hydrogen and recycle hydrogen, preferably passed through a washer (not shown), are preheated in the heat exchanger 12. The reactants are heated in preheater 6 to about 480° C., and conducted by line 7 into the first reaction vessel 8, and then by line 9, into the second reaction vessel 10. A catalytic pressure hydrogenation is carried out in the reaction vessels 8 and 10, and the reaction products are removed through line 11 and led into the heat exchanger 12 in which heat is transferred to the hydrogen fed through line 3.

The reaction products are separated in vessel 16 into a liquid portion and a hydrogen-containing gaseous portion, hydrogen being recycled through line 15. The liquid portion is withdrawn from the bottom of the vessel 16 and released to atmospheric pressure by valve 17 into the collecting vessel 18. The liquid is then heated in the tube-preheater 19, and the vapors formed are conducted into the distillation column 20. Gasoline is liberated at the upper end of the column 20, condensed in cooler 21, and collected in vessel 22. A middle oil fraction is withdrawn from the middle of the column 20, condensed in cooler 23, and collected in vessel 24. A higher boiling fraction is withdrawn at the bottom of the column, passing through cooler 25 into the collecting vessel 26.

The middle oil fraction collected in vessel 24 begins to boil at 220° C., contains 90% of components boiling up to 350° C., and has a specific gravity of 0.897 at 15° C. and an aniline point +48° C.

In portion (b) of the figure, which illustrates the process of the invention, this middle oil fraction is conducted by line 27 to be compressed by pump 28 to a pressure of about 260 atmospheres and then led together with hydrogen from line 32 to be heated in tube-preheater 29 to about 405° C. Fresh hydrogen is introduced through line 30 and compressed to the reaction pressure by pump 31. Recycle hydrogen is compressed by means of pump 43. The middle oil together with 2.5 cubic meters of hydrogen per kilogram of oil is conducted through line 29a into a first reaction vessel 33 in which the throughput is 0.9 kilogram per liter of catalyst volume per hour. The reaction temperature in this first stage is maintained at about 405° C. and the pressure at about 260 atmospheres as the reactants are passed over a catalyst of nickel silicate provided with 10% of molybdic acid.

The catalyst is prepared as follows:

590 grams of nickel carbonate (49.4% Ni) are dissolved in 550 ccs. of 98% sulphuric acid with 3 litres of water and dilutes to 7 litres. 1050 ccs. of waterglass (36% by volume of $SiO_2$) are diluted with water to 7 litres. The two solutions are rapidly mixed in a vessel and the clear sol precipitated in a stirring flask at 90° C. at a pH of 9 to 10 with 10% soda solution. The precipitate is washed free from alkali and sulphate, dried at 80° to 100° C., shaped, heated about 400° C., impregnated with ammonium molybdate solution so that 10% of $MoO_3$ is applied to the finished catalyst. After impregnation, the catalyst is heated at 400° C. for a long time.

The reaction product obtained in the first stage 33 is free from nitrogen, oxygen and sulphur compounds. After reheating it is led through line 34 into a second reaction vessel 35 in the vapour phase together with hydrogen in an amount of about 2 cubic meters per kilogram of oil with a throughput of 1.5 kilograms per litre of catalyst volume per hour at 368° C. and 260 atmospheres over a synthetically prepared aluminium silicate which is provided with 3.5% of molybdic acid.

This catalyst is prepared as follows:

An acid solution consisting of 750 grams of aluminium nitrate (9.3% by weight of $Al_2O_3$), 11 grams of ferric chloride, 31 grams of magnesium nitrate $$(Mg(NO_2)_2.6H_2O)$$

and 160 ccs. of concentrated hydrochloric acid (36%) is added while stirring rapidly to 500 ccs. of waterglass solution of density 1.34 with about 26% by weight of $SiO_2$. The two solutions may be at room temperature or raised temperature as for example 90° C. Directly after mixing, the excess of acid is neutralised by rapidly pouring in 25% ammonia water. The deposited silicate, which is obtained not as a gel but as a precipitate, is filtered off and washed with water until it is free from alkali. It is easy to filter and wash the precipitate. It is then washed with ammoniacal water. It is dried at 100° C. and the loose pulverulent silicate obtained is shaped in a pill press, impregnated with ammonium molybdate and consolidated by heating at 500° C. The catalyst contains 3.5% of $MoO_3$.

By a single passage, 60% of gasoline is obtained; the products of higher boiling point are returned to the second stage. Thus, the reaction products leave the second stage reactor 35 through line 36 and are partially condensed in cooler 37, the cooling temperature being regulated so that only the products having a higher boiling point than gasoline are condensed. The lower boiling gases containing gasoline vapors and hydrogen are separated in the vessel 37, withdrawn through line 39, and the gasoline vapors condensed in cooler 40. The liquid gasoline is collected in the separating vessel 41, the hydrogen-containing gases escaping through line 32 to be treated in washer 42 to remove volatile hydrocarbons and hydrogen sulfide after which the hydrogen is recycled by means of pump 43.

The liquid portion containing gasoline is withdrawn from the bottom of separator 41, released to atmospheric pressure by valve 44, heated in the preheater 45, and conducted to the distillation column 46. Gasoline is released at the top of the column 46, condensed in cooler 47, and collected in the vessel 48. At the bottom of the column 46, a small portion of middle oil is withdrawn, passed through cooler 49, and collected in vessel 50. This middle oil is then led through line 51 and compressed to the reaction pressure of 260 atmospheres by means of pump 52. The greater portion of middle oil from vessel 38, which was obtained by fractional condensation, is combined together with the middle oil in stream 51 to be heated in preheater 53 and returned to the second stage via line 34. The temperature in preheater 53 is regulated so as to maintain a reaction temperature of 368° C. in the second stage reactor 35.

The gasoline obtained contains 25% of aromatic hydrocarbons. It has an octane number according to the Research Method of 80. The octane number is increased to 90 by the addition of 0.04% by volume of lead tetraethyl.

Quite similar results are obtained by using other silicates of the 5th to the 8th groups, as for example vanadium silicate or tungsten silicate, as carriers in the first stage instead of nickel silicate.

By using in the first stage the catalysts conventional as refining catalysts in hydrogenation technique, which consist of active alumina or aluminum silicate as carrier which is provided with tungsten or molybdenum sulphide and a small amount of nickel or cobalt sulphide, and otherwise leaving the conditions of the second stage, there is obtained a gasoline with an octane number (Research Method) of 74 which is increased to 84 after the addition of the same amount of lead tetraethyl.

The following examples further illustrate the two-stage production of gasoline according to the invention which employs the same type of apparatus shown in portion (b) of the figure and described in Example. 1.

Example 2

A middle oil having the boiling limits 205° to 350° C. with 5% of component boiling up to 225° C. and 1.8% of phenols, obtained by low temperature carbonisation of Spanish shale is led under a pressure of 240 atmospheres together with fresh and recirculated hydrogen over a catalyst at 390° C.

This catalyst is prepared as follows:

1770 grams of cobalt carbonate (about 46% Co) are suspended in 3 litres of water, dissolved by the addition of 3.7 litres of concentrated hydrochloric acid and diluted to 21 litres with water. 3320 ccs. of waterglass (with 36% of $SiO_2$) are diluted to 21 litres with water. The two solutions are continuously supplied in equal proportions through a mixing vessel into a stirring vessel at 90° C. and cobalt silicate precipitated by the addition of 22 litres of 15% soda solution at a pH of 9 to 9.5; the precipitate is washed until free from chlorine. After adding freshly precipitated aluminium hydroxide in an amount corresponding to a content of 5% of $Al_2O_3$ in the finished catalyst, the paste is homogenised for 3 hours in a kneader, dried at 100° C., shaped into pills and heated at 400° C. The calcined pills, consisting of cobalt silicate with 5% of $Al_2O_3$, are impregnated with 10% of molybdic acid in the form of ammonium molybdate solution, dried and again heated at 400° C. in a current of air.

The throughput amounts to 1 kilogram of oil per litre of catalyst per hour. The refined product obtained is free from phenols and has 14% of components boiling up to 225° C.

This refined product is led together with 2 cubic metres of hydrogen at 420° C. with a catalyst loading of 1.3 kilograms of oil per litre of catalyst per hour under a pressure of 240 atmospheres over synthetic aluminium silicate with 3.5% $MoO_3$. This catalyst is prepared as follows:

834 grams of aluminium sulphate with 17 to 18% of $Al_2O_3$ are dissolved in 2 litres of water with the addition of 160 ccs. of 65% sulphuric acid. 480 ccs. of sodium silicate solution (each 100 ccs. containing 36 grams of $SiO_2$) are also diluted to 2 litres with water. The two solutions in the ratio 1:1 are mixed in a continuous stream in a small turbo mixer and precipitated in a second stirring vessel with 10% ammonia water at 95° C. and a pH of 6.5 The silicate precipitate is then washed with hot distilled water until free from sulphate, well filtered by suction, made into a paste with ammonium molybdate solution in such quantity that the finished catalyst will contain 3.5% of $MoO_3$, dried at 140° C., shaped into pills and heated first at 300° C. and then at 450° C. for a long time in a current of air.

By a single passage, a product is obtained which contains 65% of gasoline; the components boiling higher than gasoline are returned. In all there is obtained a gasoline with an octane number according to the Research Method of 74.

If the same middle oil is led in the first stage over the conventional refining catalysts of hydrogenation technique (as set out in the last paragraph of Example 1) the gasoline obtained has an octane number (Research Method) of only 65.

Similar results are obtained by the use of a pressure of 550 atmospheres in both stages if the temperature in the first stage is lowered to 370° C. and the same temperature of 420° C. is retained in the second stage but a catalyst loading of 2 kilograms of oil per litre of catalyst per hour is chosen.

Example 3

The middle oil obtained by pressure hydrogenation described in Example 1 is led in the first stage together with 1.8 cubic metres of hydrogen per kilogram of oil under a pressure of 75 atmospheres with a throughput of 0.5 kilogram per litre of catalyst volume per hour at 380° C. over the catalyst described in Example 1 consisting of a nickel silicate provided with 10% of $MoO_3$. The temperature is gradually raised to 440° C. during the course of the operation corresponding to the subsidence of the activity of the catalyst. After operation for four months, the catalyst is regenerated with a mixture of air and nitrogen and then used again.

The liquid reaction product obtained in the above-described first stage is freed from dissolved ammonia by cautiously leading nitrogen through and, after being heated up again, is led together with hydrogen in an amount of 1.5 cubic metres per kilogram of oil with a throughput of 0.5 kilogram per litre of catalyst volume per hour at 350° C. and the same pressure of 75 atmospheres as in the first stage over a synthetically-prepared aluminium silicate with 3.5% of $MoO_3$ as described in Example 2. The reaction temperature is raised to 500° C. at a rate commensurate with the subsidence of the activity of the catalyst. The catalyst is then regenerated in a mixture of air and nitrogen.

By a single passage there is obtained 48% of gasoline; the products of higher boiling point are returned to the second stage.

The gasoline has an octane number (Research Method) of 83 which is increased to 94 by the addition of 0.04% by volume of lead tetraethyl.

We claim:

1. A process for the production of gasoline from oils by catalyst pressure hydrogenation which comprises: leading the initial oil together with hydrogen through a first stage under a pressure of 50 to 600 atmospheres at a temperature of 250° C. to 450° C. over a synthetic silicate catalyst under such conditions of pressure, temperature and throughput that at most an immaterial cracking of about 1 to 5% occurs, said catalyst being prepared by precipitating a silicate of at least one metal selected from the class consisting of nickel and cobalt from an aqueous solution thereof, washing the resulting metal silicate precipitate and drying it at 30° C. to 150° C. for a period of 3 to 15 hours, slowly heating the dried metal silicate to temperatures of 150° C. to 400° C., and calcining the catalyst at a temperature above 400° C.; and then leading the reaction product of said first stage together with hydrogen through a second stage under a pressure of more than 50 atmospheres at a temperature of 360° C. to 550° C. over a cracking catalyst composed of a carrier selected from the group consisting of aluminum silicate and magnesium silicate, said carrier being combined with at least one member of the group consisting of oxides and sulfides of a metal of the 6th to 8th groups of the periodic system, for the purpose of cracking said reaction product of said first stage to a high octane gasoline.

2. A process as claimed in claim 1 wherein the synthetic silicate catalyst of the first stage contains up to a maximum of 10% by weight of a compound of a metal selected from the group consisting of aluminum and magnesium.

3. A process as claimed in claim 1 wherein the metal silicate of the first stage which is prepared by precipitation from an aqueous solution thereof is subsequently impregnated with at least one metal selected from the 6th and 8th groups of the periodic system such that the metal silicate is combined with a member of the group consisting of the oxide and sulfide of the impregnated metal.

4. A process as claimed in claim 3 wherein the metal silicate is nickel silicate and is subsequently impregnated with molybdenum.

5. A process as claimed in claim 3 wherein the metal silicate is cobalt silicate and is subsequently impregnated with molybdenum.

References Cited in the file of this patent

UNITED STATES PATENTS

| | | |
|---|---|---|
| 1,984,596 | Pier et al. | Dec. 18, 1934 |
| 2,464,539 | Voorhies et al. | Mar. 15, 1949 |
| 2,709,151 | Nonnemacher et al. | May 24, 1955 |

UNITED STATES PATENT OFFICE
CERTIFICATE OF CORRECTION

Patent No. 2,848,376                                     August 19, 1958

Willi Oettinger et al.

It is hereby certified that error appears in the printed specification of the above numbered patent requiring correction and that the said Letters Patent should read as corrected below.

Column 3, line 21, for "the ammoniacal" read -- with ammoniacal --; column 7, line 36, for "by catalyst" read -- by catalytic --.

Signed and sealed this 4th day of November 1958.

(SEAL)

Attest:

KARL H. AXLINE
Attesting Officer

ROBERT C. WATSON
Commissioner of Patents